United States Patent
Craig

(10) Patent No.: US 6,792,892 B2
(45) Date of Patent: Sep. 21, 2004

(54) PORTABLE PEN FOR SHIPPING LIVESTOCK BY CONTAINER SHIP, RAIL AND TRUCK

(76) Inventor: Peter C. Craig, 36080 Russell Blvd., Davis, CA (US) 95616

(*) Notice: Subject to any disclaimer, the term of this patent is extended or adjusted under 35 U.S.C. 154(b) by 0 days.

(21) Appl. No.: 09/918,697

(22) Filed: Jul. 30, 2001

(65) Prior Publication Data

US 2001/0052327 A1 Dec. 20, 2001

Related U.S. Application Data

(63) Continuation of application No. 09/151,992, filed on Sep. 11, 1998.

(51) Int. Cl.$^7$ .................................................. A01K 1/00
(52) U.S. Cl. ....................................................... 119/502
(58) Field of Search ................................. 119/502, 503, 119/510, 511, 512, 513, 514, 515

(56) References Cited

U.S. PATENT DOCUMENTS

| | | |
|---|---|---|
| 23,045 A | 2/1859 | Samuels |
| 286,976 A | 10/1883 | Utley |
| 729,702 A | 6/1903 | Trachsel |
| 747,494 A | 12/1903 | Smith |
| 1,187,990 A | 6/1916 | Hawkins |
| 1,230,484 A | 6/1917 | Howd |
| 1,636,189 A | 7/1927 | Louden |
| 3,204,606 A | 9/1965 | Parr |
| 3,292,965 A | 12/1966 | Powers |
| 3,386,600 A | 6/1968 | Betiemann |
| 3,402,845 A | 9/1968 | Ericksson |
| 3,459,326 A | 8/1969 | Betiemann |
| 3,476,084 A | 11/1969 | Nater |
| 3,530,830 A | 9/1970 | Smith |
| 3,588,166 A | 6/1971 | Day |
| 3,621,818 A | 11/1971 | Johnston |
| 3,633,963 A | 1/1972 | Haynes |
| 3,744,456 A | 7/1973 | Wheeler |
| 3,792,558 A | 2/1974 | Berce |
| 3,824,958 A | 7/1974 | Parady |
| 3,892,202 A | 7/1975 | Feterl |
| 3,968,604 A * | 7/1976 | Hills ........................ 52/745.07 |
| 3,981,410 A | 9/1976 | Schurch |
| 3,995,594 A | 12/1976 | Rose |

(List continued on next page.)

FOREIGN PATENT DOCUMENTS

| | | |
|---|---|---|
| CA | 687590 A | 6/1964 |
| DE | 2302854 A | 7/1974 |
| DE | 2825628 A1 | 1/1979 |

(List continued on next page.)

OTHER PUBLICATIONS

Undated photograph showing Modified Enclosed Containers for Shipping Livestock, a.k.a. "Cowtainers".

(List continued on next page.)

*Primary Examiner*—Thomas Price
(74) *Attorney, Agent, or Firm*—Charles R. Cypher; James R. Cypher

(57) ABSTRACT

The present invention provides a novel collapsible pen that is used in combination with a widely available modular unit used in the shipping industry. The present invention is economical to use by virtue of the fact that the pen may be stored inexpensively in a minimum of space in a disassembled state, may be assembled quickly, and may be easily and readily disassembled to permit alternate uses of the modular freight unit. The present invention consists of a collapsible pen erected on a standardized rectangular platform which has at least one side open to the air. The pen is made up of modular panels. The panels are attached to the rectangular platform, and can be used alone or in combination with any side or end walls present on the rectangular platform to create an enclosure.

16 Claims, 8 Drawing Sheets

U.S. PATENT DOCUMENTS

| | | | |
|---|---|---|---|
| 4,002,147 A | | 1/1977 | Feterl |
| 4,010,974 A | | 3/1977 | Day |
| 4,057,165 A | * | 11/1977 | Kardell .................. 16/225 |
| 4,084,714 A | | 4/1978 | Williams |
| 4,148,277 A | | 4/1979 | Engle |
| 4,151,925 A | | 5/1979 | Glassmeyer |
| 4,339,047 A | | 7/1982 | Johansson |
| 4,454,837 A | | 6/1984 | Luebke |
| 4,470,231 A | | 9/1984 | Lewis |
| 4,557,400 A | | 12/1985 | Clarke |
| 4,566,404 A | | 1/1986 | Instone |
| 4,714,169 A | | 12/1987 | Keenan |
| 4,787,603 A | | 11/1988 | Norton |
| 4,836,143 A | | 6/1989 | Shadbolt |
| 4,836,395 A | | 6/1989 | Goutille |
| 4,966,310 A | * | 10/1990 | Hawkins .................. 141/10 |
| 5,040,490 A | | 8/1991 | DeRocho |
| 5,170,746 A | | 12/1992 | Roose |
| 5,190,179 A | * | 3/1993 | Richter et al. .......... 220/1.5 |
| 5,201,498 A | | 4/1993 | Akins |
| 5,263,601 A | * | 11/1993 | Borow .................. 220/1.5 |
| 5,265,748 A | | 11/1993 | Furukawa |
| 5,275,301 A | | 1/1994 | Clive-Smith |
| 5,381,757 A | | 1/1995 | Putney |
| 5,381,915 A | * | 1/1995 | Yardley .................. 206/600 |
| 5,398,832 A | | 3/1995 | Clive-Smith |
| 5,494,167 A | | 2/1996 | Hasegawa |
| 5,651,330 A | | 7/1997 | Jewett |
| 5,671,854 A | | 9/1997 | Thomas |
| 5,676,271 A | | 10/1997 | Reynard |
| 5,761,854 A | * | 6/1998 | Johnson et al. ........ 135/116 |
| 5,806,863 A | | 9/1998 | Heger |
| 5,810,186 A | | 9/1998 | Lam |
| 5,823,375 A | | 10/1998 | Nessfield |
| 6,112,929 A | * | 9/2000 | Ota .................. 220/1.5 |

FOREIGN PATENT DOCUMENTS

| | | |
|---|---|---|
| EP | 560448 A1 | 9/1993 |
| FR | 2388491 A1 | 11/1978 |
| GB | 245610 | 1/1926 |
| GB | 848257 | 9/1960 |
| GB | 1568072 A | 5/1980 |
| GB | 2096555 A | 10/1982 |
| NL | 7508284 A | 1/1977 |
| SU | 793513 A | 1/1981 |
| SU | 1308280 A1 | 5/1987 |
| SU | 1715262 A1 | 2/1992 |
| WO | WO 93/15601 A1 | 8/1993 |

OTHER PUBLICATIONS

Tower, Courtney, Canned Cattle, The Journal of Commerce, vol. 413, No. 29,048, published Sep. 2, 1997, 3 p.

Written description of meetings between inventor and Matson employees in Aug. 1997, 1 p.

Written description of circumstances of first trial run of prototype on Sep. 12, 1997.

Letter from E.D. Stephens, Manager of Mechanical Engineering of Matson Navigation Company, Aug. 11, 1997, 2 p.

Confidential Disclosure Agreement signed by Paul Stevens, Senior V.P., Marketing Div. of Matson Navigation Company, effective as of Aug. 8, 1997, 1 p.

International Standard, Series 1 Freight Containers, Dec., 1995, Fifth Edition, Switzerland, 668.

International Standard, Freight Containers, 1981, First Edition, Switzerland, #830.

International Standard ISO 830–1981/Amendment 1, Freight Containers—Terminology, 1984, Switzerland.

International Standard, Series 1 Freight Containers—Corner Fittings—Specification, 1984, Fourth Edition, Switzerland, #1161.

International Standard, Series 1 Freight Containers, Part 5, Platform and Platform–based Containers, Switzerland #1496–5, 1994.

International Standard, Series 1 Freight Containers, Part 1, General Cargo Containers for General Purposes, Switzerland #1496–1, 1993.

International Standard, Freight Containers—Coding, Identification and Marking, Switzerland, #6346, 1995.

International Standardm, Series 1 Freight Containers, Part 5: Platform and Platform–based Containers, Switzerland, #1496–5, 1991, Second Edition.

* cited by examiner

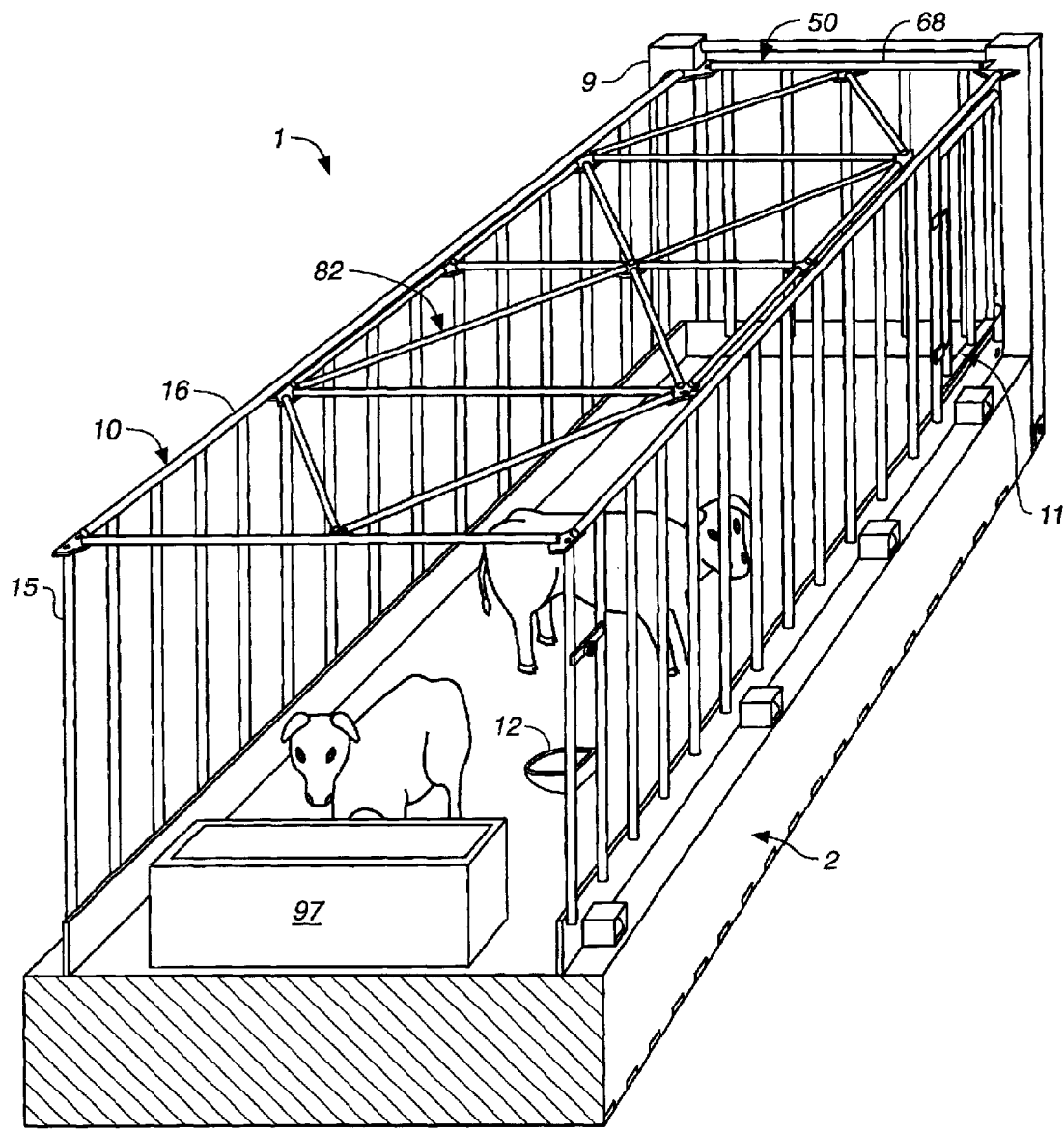
FIG._1

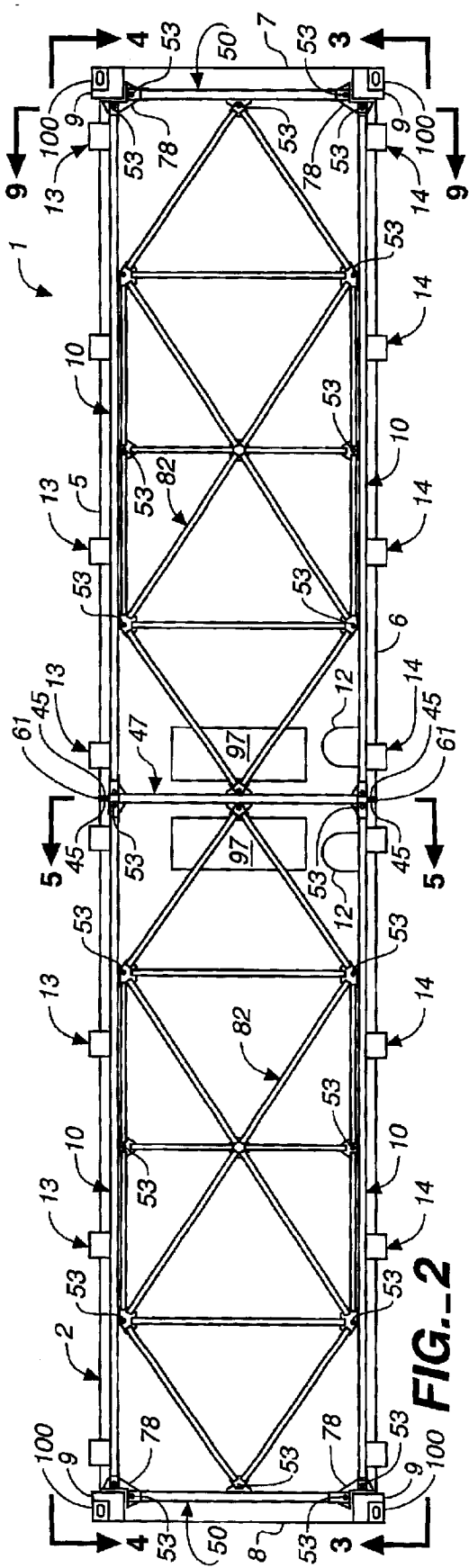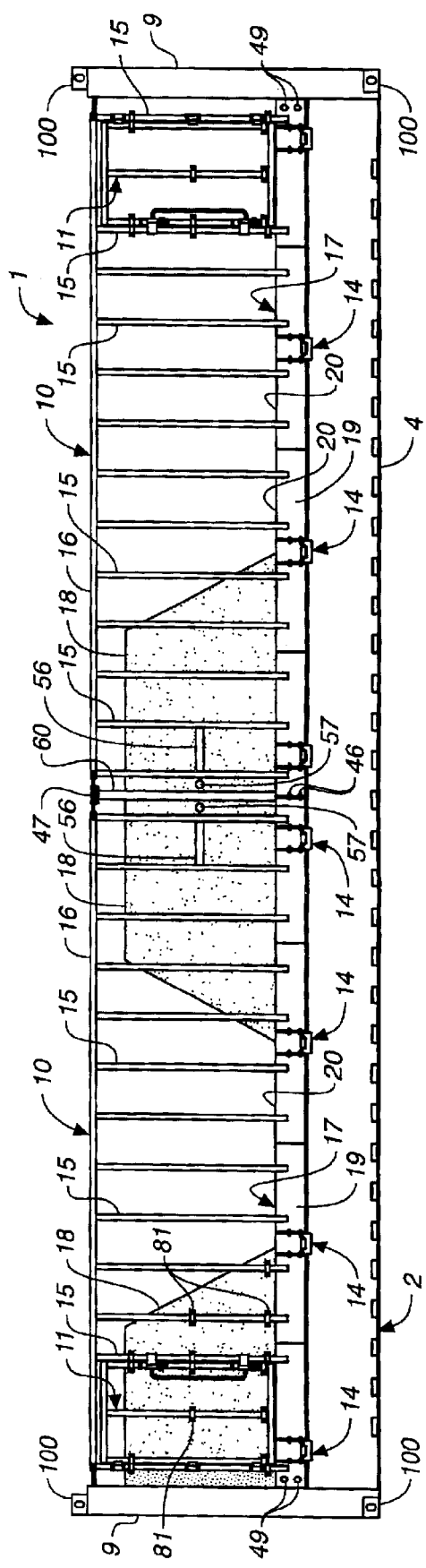

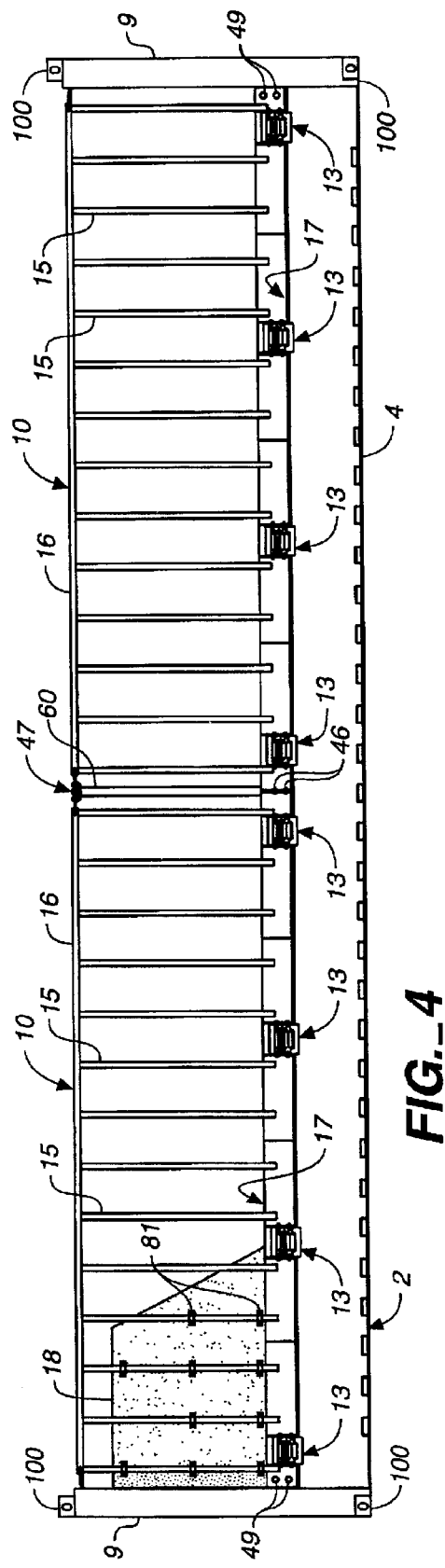
FIG._4
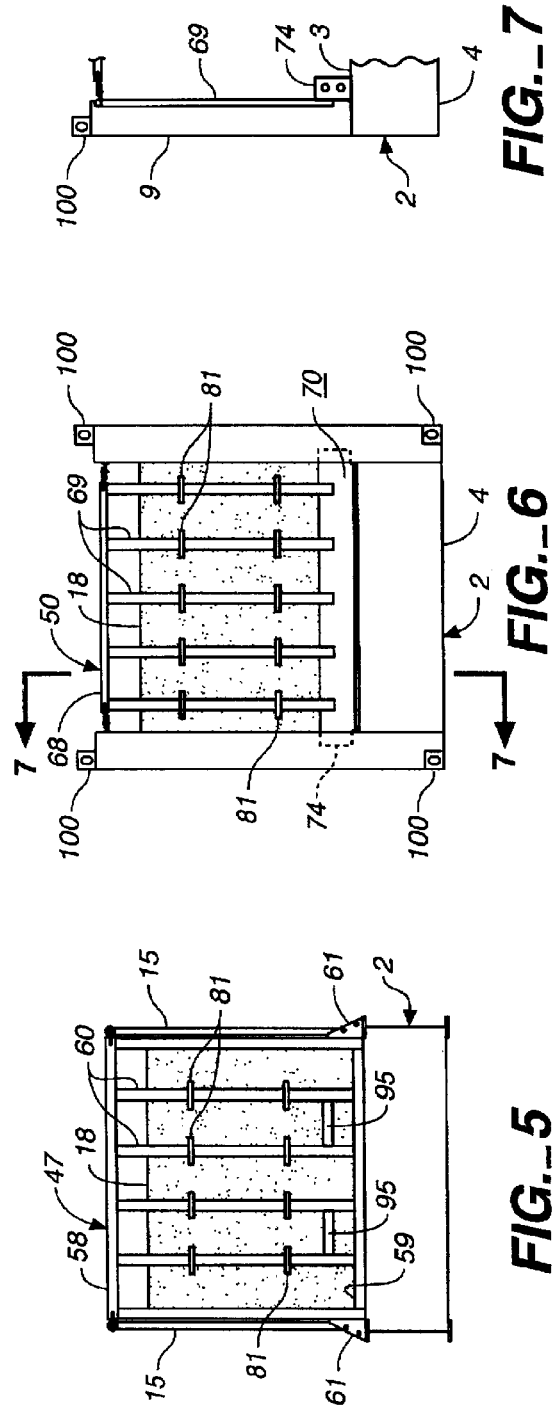
FIG._6
FIG._7
FIG._5

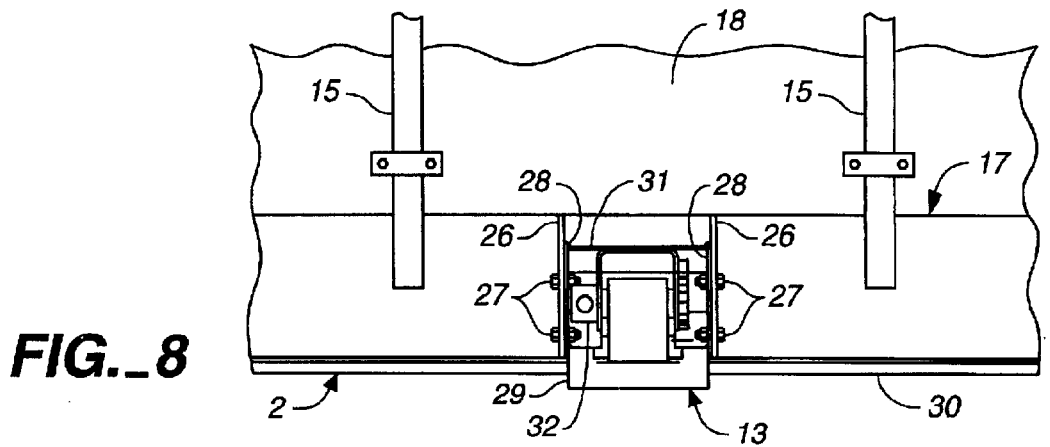
FIG._8
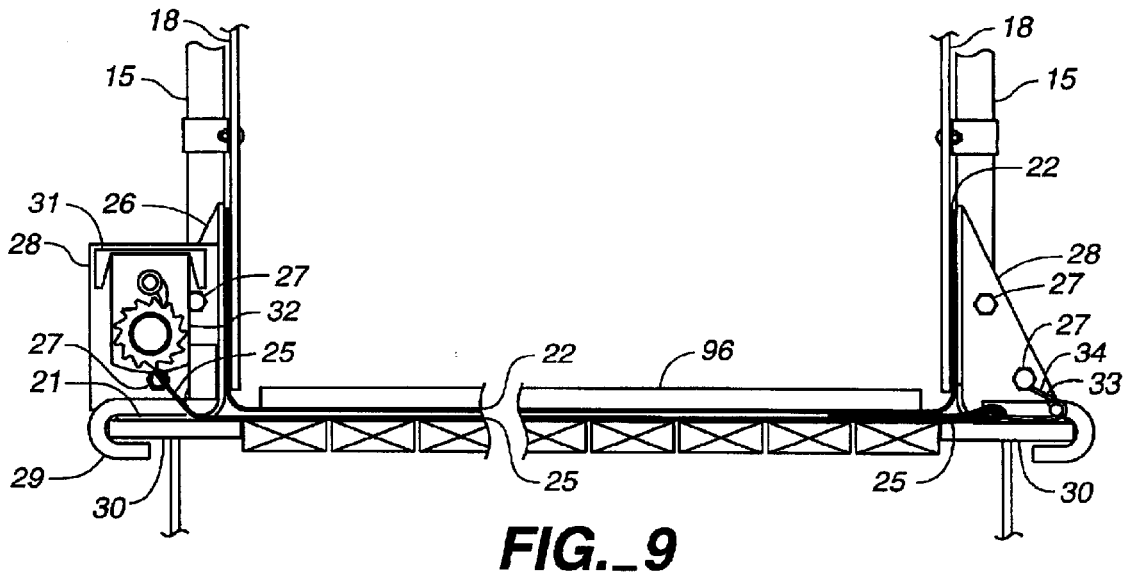
FIG._9
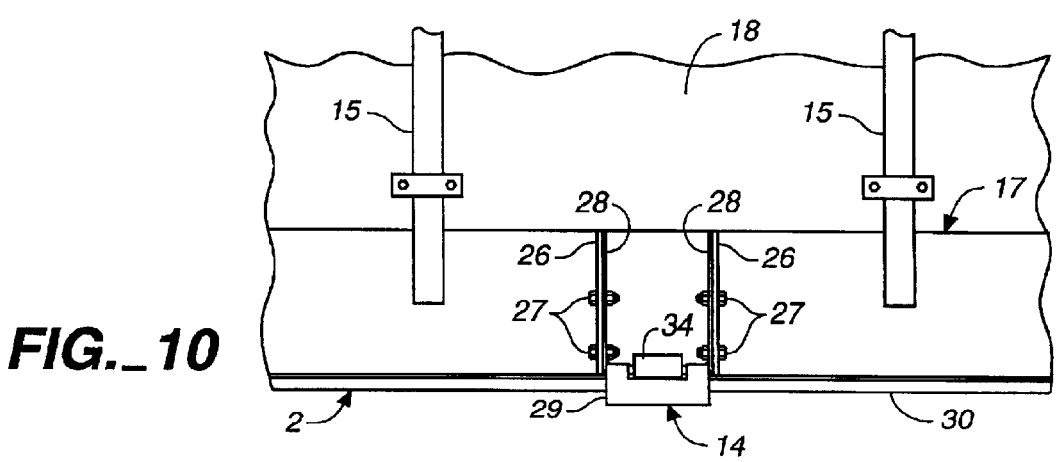
FIG._10

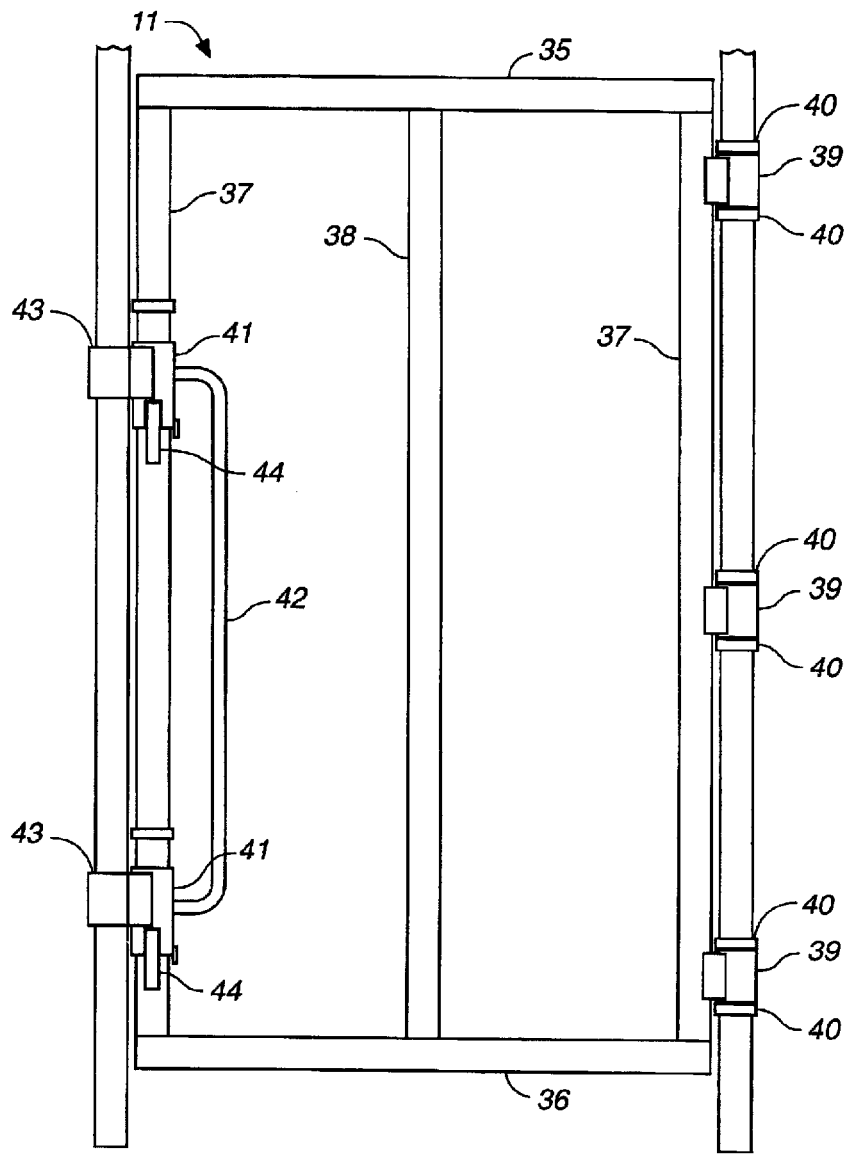
FIG._11
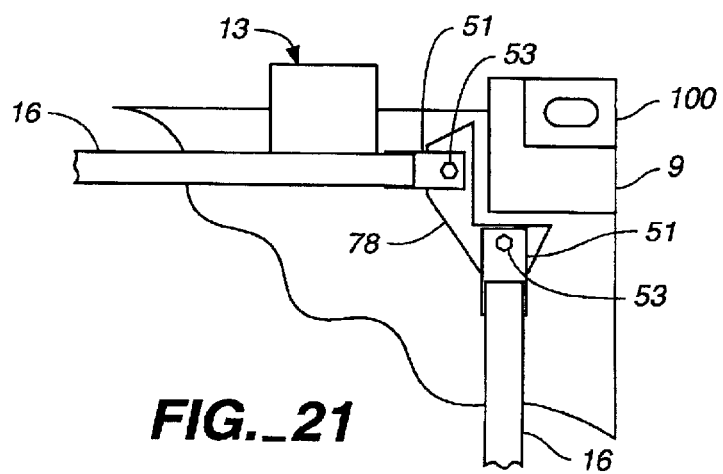
FIG._21

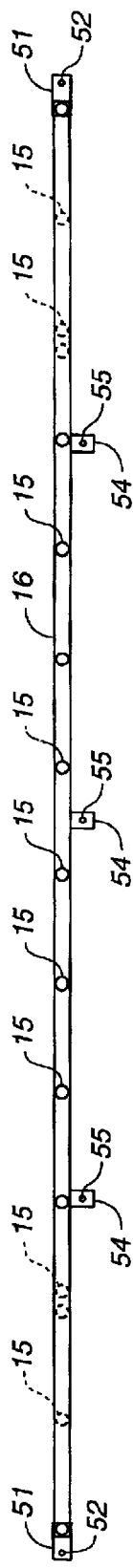
FIG._12
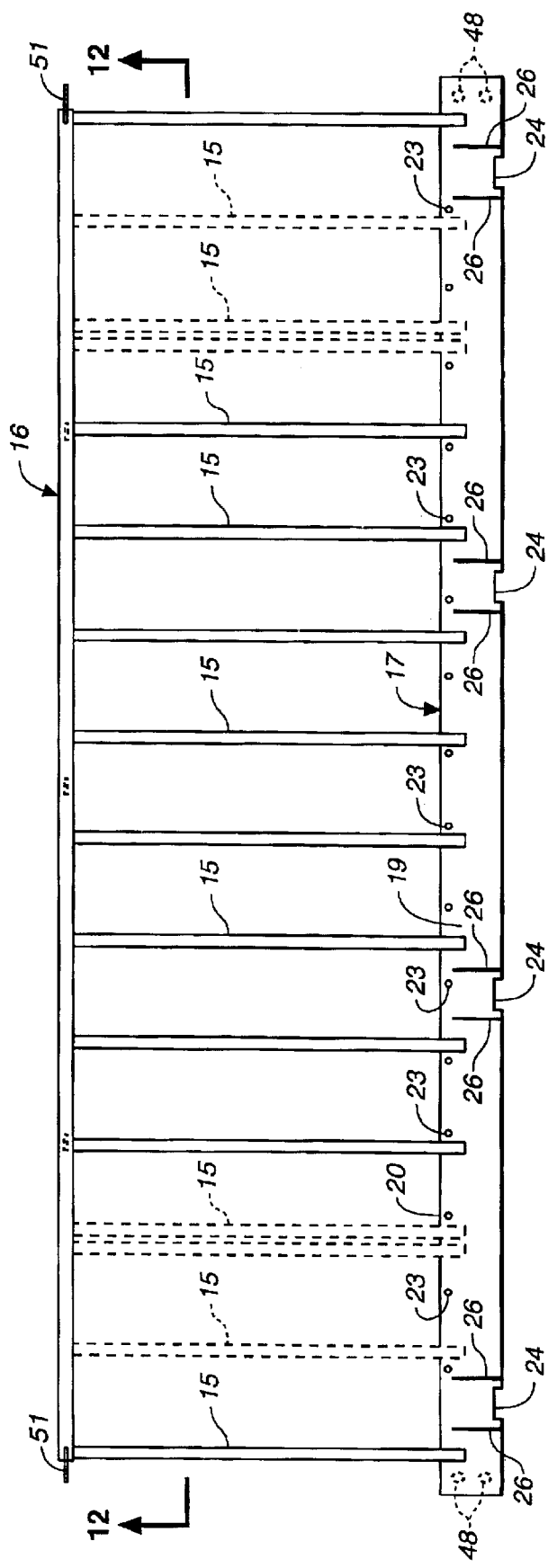
FIG._13

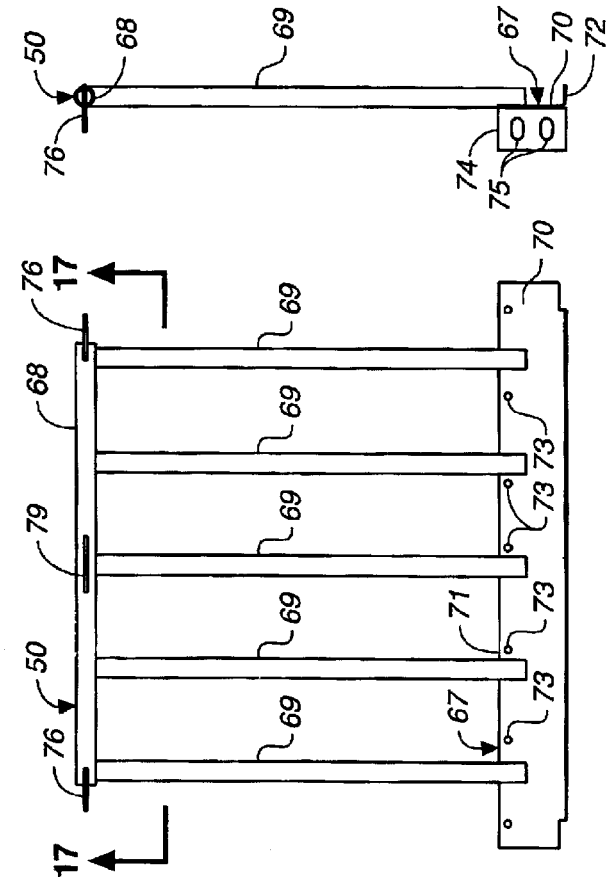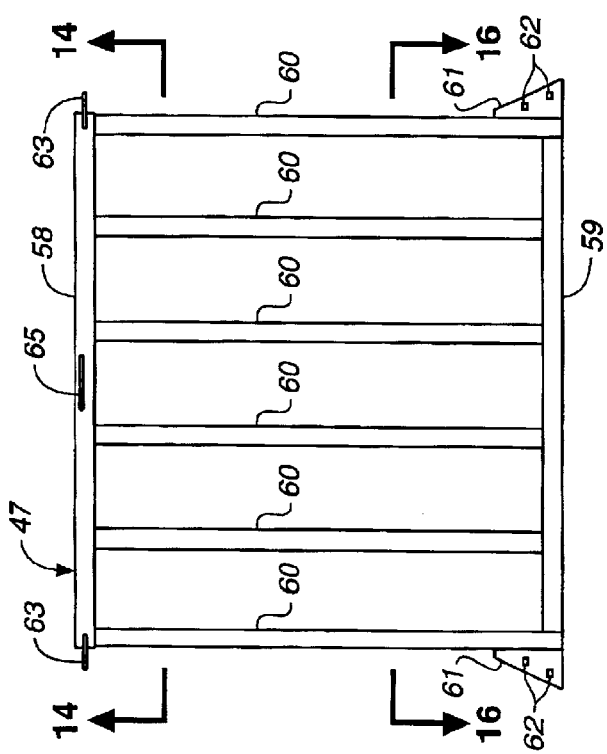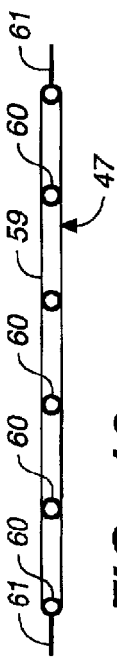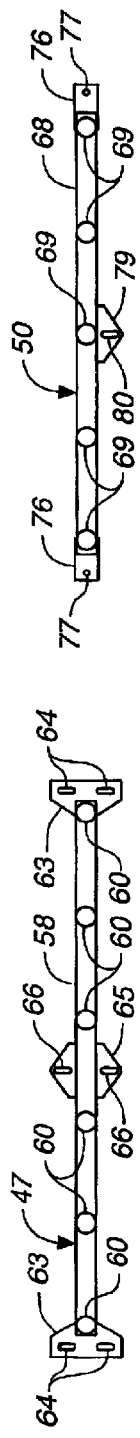

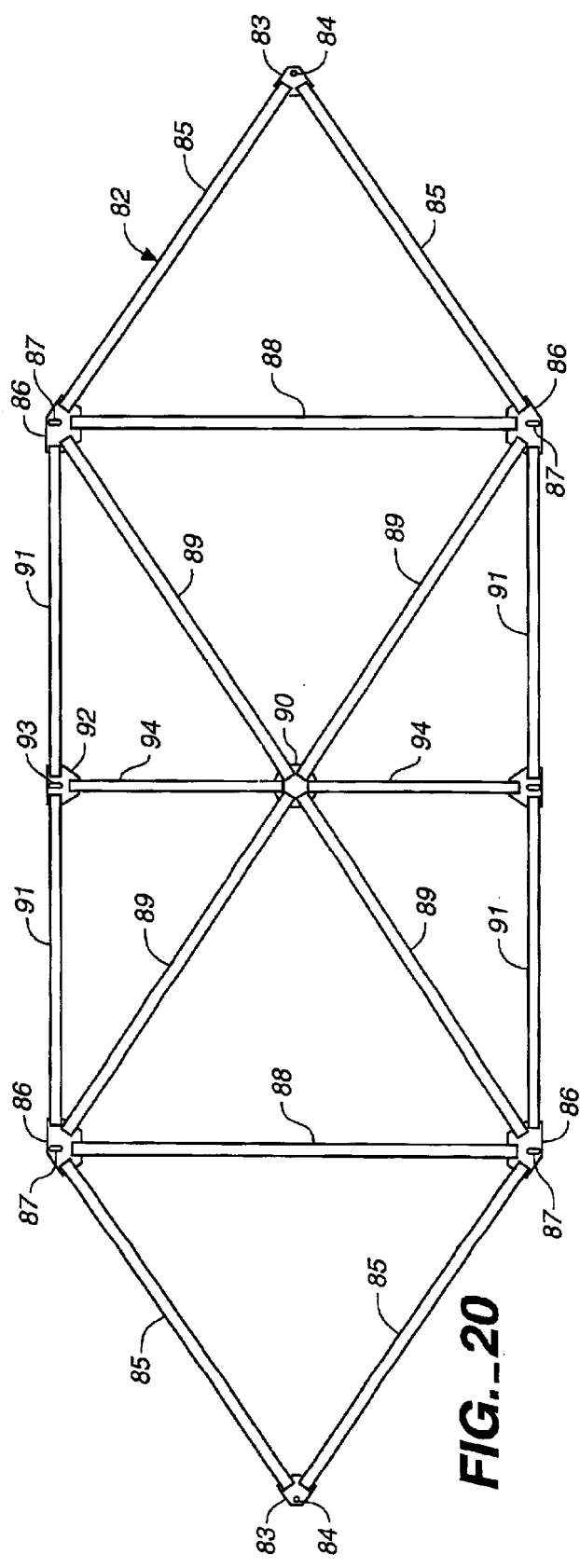
FIG._20
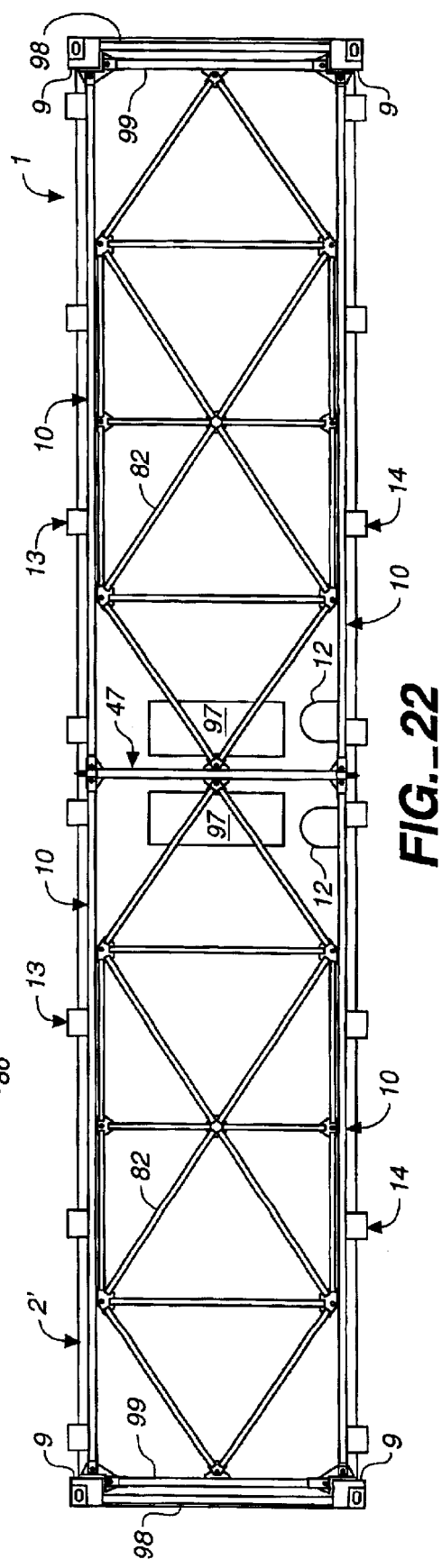
FIG._22

PORTABLE PEN FOR SHIPPING LIVESTOCK BY CONTAINER SHIP, RAIL AND TRUCK

This application is a continuation of U.S. application 09/151,992, filed Sep. 11, 1998.

BACKGROUND

This invention relates to shipping livestock. Specifically, this invention relates to the specific field of using modular units to ship livestock overseas. The present invention consists of a standard rectangular platform used in container shipping that has been modified to hold livestock. In the preferred form of the invention, the standard rectangular platform to be modified is a platform-based container with incomplete superstructure and fixed ends. One common or general descriptor, used in the trade which encompasses such a rectangular platform, is the term "flatrack". Platform-based containers can be stacked like cargo containers, and they can be transported over land by rail or by truck as well. The modifications made to the rectangular platform do not interfere with these characteristics. The modifications consist of modular panels erected around or near the perimeter of the standard rectangular platform, creating an enclosure, that can be assembled or disassembled wherever and whenever it is convenient.

The prior art teaches a number of methods for shipping livestock overseas in modular units.

If only one or only a few animals are to be shipped, the prior art teaches using special conveyances adapted to fit in the belly of a commercial plane. See U.S. Pat. No. 4,566,404 granted to Giles A. Instone and Jeremy A. Instone, entitled: Animal Conveyance Capable of Conversion into an Air Freight Container (Instone '404). Instone '404 teaches that it is desirable that a conveyance for shipping livestock be capable of multi-functional use. This means that the conveyance need not be transferred empty from one location to another, wasting valuable cargo space. Like Instone '404, the present invention is a conveyance designed for the transportation of livestock which is also capable of being converted with minimal effort into a conveyance for other freight.

Another approach, suitable when more than just a few animals are to be shipped, has been to modify general purpose containers so that livestock can be shipped on container ships. See U.S. Pat. No. 5,651,330 granted Jul. 29, 1997 to Larry Hayward Jewett, entitled: Shipping Container for Shipping Livestock. Using a modified general purpose container creates a number of efficiencies. First, a standardized general purpose container can be loaded onto a tractor-trailer rig, a train car or an ocean or lake freighter. This minimizes time lost in transferring a load from one mode of transportation to the next. Secondly, by using modular containers the load carrying ability of the vehicle or vessel involved is maximized. A shipper can take only a few units or a large number of units and fill excess space with other types of goods.

However, modified general purpose containers present a problem if animals are to be shipped in only one direction. Since modified general purpose containers are usually not suitable for carrying other types of cargo, they often travel the return journey empty, wasting money and space. The present invention avoids this problem by adding components to a standard platform-based container that can be easily removed, rather than making permanent changes to the platform-based container.

Another approach is taught by U.S. Pat. No. 5,040,490, granted to Mark DeRoche, entitled Collapsible Livestock Transport Stable (DeRoche '490). DeRoche '490 uses collapsible modular stables to ship livestock. The stables of DeRoche '490 are easily disassembled and assembled. While the modular stables of DeRoche '490 are not designed to travel on container ships, where the efficiencies of shipping mixed cargo are maximized, the stables of DeRoche '490 are designed to be easily collapsed and stored in a minimum of space. This means that if animals are to be shipped only one way, the stables can make the return journey in a collapsed state taking up less room and therefore saving on transportation costs. The present invention is like DeRoche '490 in that is provides a conveyance for shipping livestock that can quickly and easily be disassembled wherever it is convenient. Further, like DeRoche '490, the panels of the present invention can be shipped in a disassembled state in a minimum of space. The present invention improves upon DeRoche '490 by using a standard platform-based container as its base. This means not only that the present invention can be used on container ships, but further that its largest component can be utilized to carry other cargo rather than travel unused on return trips when no livestock are shipped.

The present invention provides a novel collapsible pen that is used in combination with a widely available modular unit used in the shipping industry. The present invention is economical to use by virtue of the fact that the pen may be stored inexpensively in a minimum of space in a disassembled state, may be assembled quickly, and may be easily and readily disassembled to permit alternate uses of the modular freight unit.

SUMMARY OF THE INVENTION

The present invention consists of a collapsible pen erected on a standardized rectangular platform which has at least one side open to the air. The pen is used for shipping livestock. The pen is made up of modular panels. The panels are attached to the rectangular platform, and can be used alone or in combination with any side or end walls present on the rectangular platform to create an enclosure. The present invention provides a means of transport that provides adequate ventilation for the health and safety of the livestock, while also adequately containing the animals' fecal waste. The present invention further takes advantage of the efficiencies available in container shipping.

It is the principal object of the present invention to provide a novel and improved conveyance for shipping livestock.

It is a further object of the present invention to provide a conveyance that is suitable for transporting livestock by truck, rail and ship.

It is a further object of the present invention to provide a pen or corral suitable for use on a platform-based container, that can quickly and easily be disassembled so that the platform-based container on which it is erected can be used for carrying other cargo.

The panels of the present invention are designed so that they can be stacked in a minimum of space such that the components for multiple conveyances can fit on one platform-based container for return journeys when they are not used.

A further object of the present invention is to provide an improved livestock carrier unit which can be converted completely into a general cargo container leaving no trace of its use as a livestock carrier.

A further object of the present invention is the provision of an improved portable livestock pen which is efficient in operation, sturdy in use, and economical to manufacture.

DETAILED DESCRIPTION OF THE DRAWINGS

FIG. 1 is a simplified, sectional, perspective view of a partially completed portion of the portable livestock pen of the present invention. Cattle are shown contained inside the pen. The posts of the platform based container open sided are shown without corner fittings which can be added.

FIG. 2 is a top plan view of the portable livestock pen of the present invention. The winch and hook assemblies are not shown in detail.

FIG. 3 is a side view of the portable livestock pen of the present invention taken along line 3 of FIG. 2.

FIG. 4 is a side view of the portable livestock pen of the present invention taken along line 4 of the FIG. 2.

FIG. 5 is a transverse sectional view of the portable livestock pen of the present invention showing the mid panel of the present invention, taken along line 5.

FIG. 6 is an end view of the portable livestock pen of the present invention taken along line 6 of FIG. 1. The other end view of the portable livestock pen is similar.

FIG. 7 is a sectional side view of an end panel of the portable livestock pen. A portion of a first top truss is shown.

FIG. 8 is a detail of the winch assembly. The front portion of the mounting flange is not shown so that the connection between the winch and the mounting flange can be shown.

FIG. 9 is transverse cross section of the portable livestock pen of the present invention, showing the winch assembly and the hook assembly in detail.

FIG. 10 is a detail of the hook assembly.

FIG. 11 is a detail of a gate in a side panel of the present invention.

FIG. 12 is a cross-sectional view of a side panel taken along line 12 of FIG. 13.

FIG. 13 is a front view of a side panel of the present invention. The studs shown in phantom represent alternate positions for studs depending on whether a gate is installed in the side panel.

FIG. 14 is a cross-sectional view taken along line 14 of FIG. 15.

FIG. 15 is a front view of the middle panel of the present invention.

FIG. 16 is a cross-sectional view taken along line 16 of FIG. 15.

FIG. 17 is a cross-sectional view taken along line 17 of FIG. 18.

FIG. 18 is a front view of an end panel of the present invention.

FIG. 19 is a side view of an end panel of the present invention.

FIG. 20 is a top plan view of a one of the trusses of the top frame of the present invention.

FIG. 21 is a detail plan view of a corner portion of the livestock pen of the present invention showing the corner bracket.

FIG. 22 is a plan view of an alternate form of the livestock pen of the present invention erected on a rectangular platform based container open sided with incomplete superstructure and fixed ends and end walls disposed between the corner posts.

DESCRIPTION OF THE PREFERRED EMBODIMENT

The present invention consists of a livestock pen 1 for transporting livestock by rail, truck or on a container ship with other standardized freight containers. The pen has a base. The base consists of a rectangular platform 2 having a top 3 and a bottom 4, and a perimeter extending around the top of the rectangular platform 2, defined by two side edges 5 and 6 and two end edges 7 and 8. The two side edges 5 and 6 and two end edges 7 and 8 meet at four corners. Four posts 9 of equal height are attached to the rectangular platform. The four posts 9 are located at the four corners and extend from the top 3 of the rectangular platform 2. The posts 9 together with the two side edges 5 and 6 and the two end edges 7 and 8 define four perimeter planar areas which extend perpendicular to the rectangular platform 2 and from the top 3 of the rectangular platform 2 at its perimeter. During transit of the rectangular platform 2, at least one of the perimeter planar areas is open to the air, having no wall, panel or other fixed closure means which is part of the rectangular platform 2. Further the rectangular platform 2 is of standardized dimensions, formation and configuration such that the rectangular platform 2 is suitable for transport on a container ship stacked with other standardized freight containers. The pen 1 further has a plurality of panels erected on and connected to the rectangular platform 2, creating an enclosed area on the rectangular platform for containing livestock.

The International Organization of Standardization (ISO) provides definitions of freight containers that are useful in defining the rectangular platform 2 of the present invention. These definitions are found in a publication called ISO 830 Freight containers—Terminology, First Edition, 198-11-15, hereinafter called ISO 830:1981.

ISO 830:1981 first identifies a subgroup of freight containers called general cargo containers. At section 4.1.1 of ISO 830:1981 the term "general cargo container" is defined as follows: "This is a general term applicable to any type of container which is not intended for use in air mode transport and which is not primarily intended for the carriage of a particular category of cargo such as a cargo requiring temperature control, a liquid or gas cargo, dry solids in bulk or cargoes such as automobiles (cars) or livestock." The rectangular platform 2 that serves as the base of the present invention is a sub-group of general cargo containers as defined.

ISO 830:1981 then goes on to distinguish general purpose containers from specific purpose containers. At ISO 830:1981 section 4.1.1.1 a "general purpose container" is defined as a "[f]reight container, totally enclosed and weather-proof, having a rigid roof, rigid side walls, rigid end walls and a floor, having at least one of its end walls equipped with doors and intended to be suitable for the transport of cargo of the greatest possible variety." The rectangular platform 2 of the present invention is not a general purpose container as defined.

A "specific purpose container" is considered a "general term applicable to all general cargo containers having constructional features either for the "specific purpose" of facilitating packing and emptying other than by means of doors at one end of the container, or for other specific purposes such as ventilation." ISO 830:1981 section 4.1.1.2. The rectangular platform 2 of the present invention is a sub-group of specific purpose containers as defined.

The term "rectangular platform" as used in the claims is considered to encompass the term "platform based container open sided" as defined in ISO 830:1981 at section 4.1.1.2.3, except any limitations as to series designations should be omitted from the definition of "rectangular platform". The term "platform based container open sided" is "applied to any general cargo container which does not have rigid side walls or equivalent structures I capable of withstanding all of the loads that may be withstood or transmitted by a side wall of a general purpose container and which, for this reason has a base structure similar to that of a platform (container). (See 4.1.1.2.4)." ISO 830:1981, section 4.1.1.2.3.

ISO 830:1981 at section 4.1.1.2.4 defines a "platform (container)" as a "[l]oadable platform having no superstructure whatever but having the same length and width as the base of a container of the same series and equipped with top and bottom corner fittings, located in the plan view as on containers of series 1, so that some of the same securing and lifting devices can be used."

ISO 830:1981 discusses three main sub-types of platform based container open sided. The first is "the platform based container open sided with complete superstructure" which is defined as a "[p]latform-based container, having a permanently fixed longitudinal load-carrying structure between ends at the top." ISO 830:1981, section 4.1.1.2.3.1. This sub-type is further divided into "those having a rigid roof and rigid end walls (open sided); . . . those having an open top and rigid end walls; . . . those having an open top and open ends (skeletal)." ISO 830:1981, section 14.1.1.2.3.1. The second sub-type are "platform based containers with incomplete superstructure and fixed ends" which are defined as a "[p]latform based container without any permanently fixed longitudinal load-carrying structure between ends other than at the base." ISO 830:1981, section 4.1.1.2.3.2. The third sub-type defined is a "platform based container with incomplete superstructure and folding ends." This sub-type is defined at ISO 830:1981, section 4.1.1.2.3.3, as a "platform based container with incomplete superstructure (as envisaged in 4.1.1.2.3.2) but having folding end frames with a complete transverse structural connection between corner posts."

A description follows of the construction and attachment of the modular panels to a 40' by 8' by 8' rectangular platform 2 of standardized dimensions, formation and configuration such that the rectangular platform 2 is suitable for transport on a container ship stacked with other standardized freight containers. Such a construction constitutes the preferred embodiment of the present invention and is shown in FIG. 2. In the preferred embodiment, the rectangular platform 2 is a platform based container with an incomplete superstructure and fixed ends, wherein the fixed ends consist of fixed free-standing posts 9.

The platform based container open sided with an incomplete superstructure and fixed ends consisting of free-standing posts 9 of the preferred embodiment is built in conformance with the following International Organization of Standardization publications, the disclosure of which is incorporated by reference:

ISO 668 Series 1 freight containers—Classification, dimensions and ratings, Fifth Edition, 1995-12-15;
ISO 830 Freight Containers Terminology, First Edition, 1981-11-15;
ISO 1161 Series 1 freight containers—Corner Fittings Specification, Fourth Edition, 1984-12-15;
ISO 1496-5 Series 1 freight containers—Specification and testing—Part 5: Platform and platform-based containers, Second Edition, 1991-12-15;
ISO 1496-5 Series 1 freight containers—Specification and testing—Part 5: Platform and platform-based containers Amendment 1, Second Edition, 1993-03-01;
ISO 1496-5 Series 1 freight containers—Specification and testing—Part 5: Platform and platform-based containers Amendment 2, Second Edition, 1994-09-01;
ISO 6346 Freight Containers—Coding, identification and marking, Third Edition, 1995-12-01.

These publications are made available to the general public in the United States by the American National Standards Institute, located at 11 West 42nd Street, New York, N.Y., 10038. These publications detail ISO construction standards for all platform based containers open sided.

As shown in FIG. 2, in the preferred embodiment, two side panels 10 are used to span the distance between the corner posts 9 of the rectangular platform 2 along its elongated side edges 5 and 6. On a 40' rectangular platform, a total of four side panels 10 are used. See FIG. 2. The four side panels 10 are similar in construction. Variations in construction are determined by whether a side panel 10 will be fitted with a gate 11, whether it will be fitted with a water trough 12 or other accessories, and whether it will be fitted with a winch assembly 13 or a hook assembly 14.

FIG. 13 shows a preferred side panel 10 prior to being fitted with either a winch assembly 13 or a hook assembly 14. Phantom lines are meant to represent the alternate sites for the attachment of studs 15 depending on whether a gate 11 or gates 11 are built into the side panel 10. If a gate 11 is to be positioned near an end of a side panel 10, the first two studs 15 near that particular end of the panel shown in phantom are not used, and only the third and next stud 15 shown in phantom lines is used. If no gate 11 is to be positioned near a particular end of a side panel 10, then studs 15 are placed at the first two sites demarcated in phantom lines near that particular end, and the next site shown in phantom lines is not used.

The side panel 10 is framed with a top rail 16 and a kick plate 17 along the top and bottom edges of the side panel 10 respectively. The top rail 16 and the kick plate 17 are disposed generally parallel to each other. See FIG. 13.

A plurality of vertically disposed studs 15 connect the top rail 16 to the kick plate 17. The number of vertically disposed studs 15 used will depend on the desired spacing between the studs 15 and whether the side panel 10 will be formed with a gate 11. The studs 15 should be spaced close enough to adequately support the paneling 18 against being pushed too far out by the animals and to provide sufficient rigidity to the side panel 10. In the preferred embodiment, where cattle are to be transported, the studs 15 are generally spaced 16.5625" apart. The studs 15 are welded to the top rail 16 and the kick plate 17. Preferably, the tops of the studs 15 are cut to form a saddle in which the top rail 16 can rest.

The top rail 16 and studs 15 are made of hollow 6061-T6 aluminum tubing. The top rail 16 tubing has a diameter of 2'. The studs 15 have a diameter of approximately 1.5". The kick plate 17 is also made from 6161-T6 aluminum, and is approximately ¼ thick.

The kick plate 17 is formed with a generally elongated planar main body 19, having a top edge 20, and with an outwardly extending lower flange 21 disposed at a right angle to the main body 19 of the kick plate 17. See FIGS. 13 and 9. This lower flange 21 rests on the rectangular platform 2. Because, in the preferred form, the impermeable membrane 22 for containing the livestock waste is tied to the kick plate 17 near its top edge 20, the kick plate 17 needs to be tall enough to anchor the impermeable membrane 22 above the level of waste in the enclosure. See FIG. 9. As is shown in FIG. 13, openings 23 are provided in the kick plate 17 near its top edge 20 for anchoring the impermeable membrane 22.

As is shown in FIG. 13, notches 24 are made in the kick plate 17 at intervals along its length. The notches remove material from the lower flange 21 and portions of the main body 19. These notches 24 are designed to receive straps 25 that will connect opposed side panels 10 when the enclosure is erected. On either side of each notch 24, panel gussets 26 are welded to the kick plate 17. See FIGS. 8, 9 and 10. The generally triangular panel gussets 26 connect to the main body 19 of the kick plate 17 and the lower flange 21 of the kick plate 17 along two sides. The panel gussets 26 are formed with openings for receiving first attachment fasteners 27. The panel gussets 26 are used to connect either winch assemblies 13 or hook assemblies 14 to the kick plate 17 of the side panel 10 by means of the first attachment fasteners 27. See FIGS. 8, 9 and 10.

As shown in FIGS. 8 and 10, the winch assemblies 13 and the hook assemblies 14 are each formed with two side plates 28 and a outwardly extending flange hook 29 that comprises the base for the assembly. These members can be welded together. The flange hooks 29 of the winch and hook assemblies 13 and 14 receive the side flanges 30 on the rectangular platform 2 and anchor the side panels 10 to the rectangular platform 2. Openings are formed in the side plates 28 of the winch and hook assemblies 13 and 14. These openings align with the openings in the panel gussets 26 when the winch and hook assemblies 13 and 14 are installed properly. First attachment fasteners 27 pass through the openings in the side plates 10 and through the openings in the panel gussets 26. The first attachment fasteners 27 are preferably machine bolts with threaded nuts.

As shown in FIGS. 8 and 9, the winch assemblies 13 are further formed with a mounting flange 31 disposed between the side plates 28 near the top of the side plates 28. A winch 32 is mounted on the mounting flange 31 for tensioning the strap 25 that connects opposed side panels 10. The winch 32 can be welded to the mounting flange 31. The strap 25 as a tensioning member braces the side panels 10 against forces that would push them outward.

In the preferred form, the hook assemblies 14 are formed with a pin 33 that can receive a hook 34 attached to the strap 25 that braces the lower ends of the side panels 10. See FIG. 9. The pin 33 can be welded to the flange hook 29 of the hook assembly 14. When the enclosure is erected on a rectangular platform 2, an elongated strap 25 with a hook 34 is attached to the pin 33 of the hook assembly 14 and the free end of the strap 25 is run through the notch 24 in the side panel 10 to which the hook assembly 14 is adjacent. As shown in FIG. 9, the strap 25 runs across the rectangular platform 2 to its other side and through a corresponding notch 24 in the kick plate 17 of the opposed side panel 10. The free end of the strap 25 is threaded into the winch 32 and a lever is used to turn the winch 32 until the strap 25 is wound tightly onto the winch 32 and placed in tension such that it can brace the opposed side panels 10 against outward displacement forces.

As mentioned earlier, preferably, some of the side panels 10 are formed with gates 11 for the ingress and egress of the animals and handlers. FIG. 11 shows a detailed view of a gate 11 formed in a side panel 10. The gate 11 is framed with a top strut 35, a bottom strut 36, two vertically disposed end struts 37 and an intermediate vertical strut 38. The struts 35, 36, 37 and 38 are welded to each other. Hinges 39 for the gate 11 are mounted on one of the end struts 37 of the gate 11. The hinges 39 receive one of the studs 15 of the side panel 10. Annular rings 40 are welded onto the stud 15 received by the hinges 39 to appropriately position the hinges 39. The other end strut 37 of the gate 11 is formed with a latching mechanism 41. The latching mechanism 41 rotates on the end strut 37 and is manipulated with a handle 42. Tabs 43 on the latching mechanism 41 receive the other stud 15 of the side panel 10 that frames the gate 11 when the gate 11 is in its latched position. The latching mechanism 41 is provided with a locking mechanism 44 that prevents the latching mechanism 41 from rotating on the end strut 37 unless the latching mechanism 41 is raised above the locking mechanism 44.

As shown in FIG. 2, in the preferred embodiment, the kick plate 17 of each side panel 10 at a selected end is further provided with a mid-panel connector gusset 45. This mid-panel connector gusset 45 is similar to the panel gussets 26 welded to the kick plate 17. The mid-panel connector gusset 45 is also welded to the kick plate 17. The mid-panel connector gusset 45 is formed with openings for receiving second attachment fasteners 46. The second attachment fasteners 46 connect the mid-panel connector gusset 45 to a gusset on the middle panel 47 and to the corresponding mid-panel connector gusset 45 on the adjacent side panel 10. The second attachment fasteners 46 are also preferably machine bolts with threaded nuts.

In the preferred embodiment, the kick plate 17 of each side panel 10 at a second selected end is formed with end panel attachment openings 48 for receiving third attachment fasteners 49. See FIGS. 3 and 13. Positions for these openings 48 are shown in phantom in FIG. 13. The third attachment fasteners 49 connect the kick plate 17 of the side panel 10 to the adjacent end panel 50. The third attachment fasteners 49 are also preferably machine bolts with threaded nuts.

In the preferred embodiment, the top rail 16 of the side panel 10 is provided with a plurality of connection tabs. See FIG. 12. The connection tabs attach the top rail 16 to the other components of the enclosure. The first set of connection tabs are the side panel end tabs 51 which are located at the ends of the top rail 16. The side panel end tabs 51 are each formed with an opening 52 for receiving a fourth attachment fastener 53. The fourth attachment fasteners 53 are also preferably machine bolts with threaded nuts. Preferably, the ends of the top rails 16 are notched and the side panel end tabs 51 are inserted into the notches and welded in place. The side panel end tabs 51 are generally planar and rectangular in configuration, and extend parallel to the rectangular platform. The side panel end tabs 51 are made from 6061-T6 aluminum and are approximately ¼" thick.

The second set of connection tabs on the side panel top rail 16 are the side panel intermediate tabs 54. See FIG. 12. In the preferred embodiment, there are three such side panel intermediate tabs 54 spaced at regular intervals along the top rail 16. The side panel intermediate tabs 54 are also formed as generally rectangular planar members. Each is formed with an opening 55 for receiving a fourth attachment fastener 53. The side panel intermediate tabs 54 extend generally perpendicular to the studs 15 and generally parallel to the rectangular platform 2 when the enclosure is erected. The side panel intermediate tabs 54 are welded to the top rail 16. The side panel intermediate tabs 54 are made from 6061-T6 aluminum and are approximately ¼" thick.

As shown in FIGS. 2 and 3 the side panels 10 can be fitted with additional accessories. As shown in FIG. 2, two of the side panels 10 are fitted with water troughs 12. As shown in FIG. 3, each of the side panels shown is fitted with a strut 56 disposed between two of the studs 15 for mounting a water trough 12. Next to each strut is a hose bib 57 for providing water to the trough 12. Preferably, the trough 12 is fitted with an automatic shut-off valve that is triggered when the level of the water in the trough 12 reaches a certain height.

To provide rigidity to the preferred embodiment built on a 40' rectangular platform 2, a middle panel 47 is also used.

The middle panel 47 traverses the rectangular platform 2 and is connected to all four side panels 10. See FIG. 2.

As is shown in FIG. 15, the middle panel 47 is framed with a top rail 58 and a bottom rail 59 along the top and bottom edges of the middle panel 47 respectively. The top rail 58 and the bottom rail 59 are disposed generally parallel to each other.

A plurality of vertically disposed studs 60 connect the top rail 58 to the bottom rail 59. The number of vertically disposed studs 60 used will depend on the desired spacing between the studs 60. The studs 60 should be spaced close enough to adequately support the paneling 18 against being pushed by the animals and to provide sufficient rigidity to the middle panel 47. In the preferred embodiment, where cattle are to be transported, the studs 60 are generally spaced 15" apart. The studs 60 are welded to the top rail 58 and the bottom rail 59. Preferably, the tops and bottoms of the studs 60 are cut to form a saddle in which the top rail 58 and the bottom rail 59 can rest.

The top rail 58, bottom rail 59 and studs 60 are made of hollow 6061-T6 aluminum tubing. The tubing for the top and bottom rails 58 and 59 has a diameter of 2.5". The studs 60 also have a diameter of approximately 2.5".

As shown in FIGS. 15 and 16, side panel connector gussets 61 are welded to the two outermost studs 60 of the middle panel 47. These gussets 61 are generally planar and triangular and lie in line with the bottom rail 59. They are connected on the outside of the outermost studs 60 along one edge, preferably by welding. The generally triangular side panel connector gussets 61 are formed with openings 62 for receiving second attachment fasteners 46. The side panel connector gusset 61 is similar to the mid-panel connector gussets 45 welded to the kick plates 17 of the adjacent side panels 10. When the pen 1 is erected, the side panel connector gusset 61 of the middle panel 47 will lie between the two adjacent mid-panel connector gussets 45 with the openings in the three gussets 61 and 45 in alignment. See FIG. 2. The second attachment fasteners 46 are inserted through the aligned openings and tightened so that the gussets 61 and 45 are held firmly together.

As shown in FIG. 14, in the preferred embodiment, the top rail 58 of the middle panel 47 is provided with a plurality of connection tabs. The connecting tabs attach the top rail 58 to the other components of the enclosure. The first set of connection tabs are the mid-panel end tabs 63 which are located at the ends of the top rail 58. The mid-panel end tabs 63 are each formed with two openings 64 for receiving fourth attachment fasteners 53. Preferably, the ends of the top rail 58 are notched and the mid-panel end tabs 63 are inserted into the notches and welded in place. The mid-panel end tabs 63 are generally planar in configuration, and extend parallel to the rectangular platform. The mid-panel end tabs 63 are made from 6061-T6 aluminum and are approximately ¼" thick.

The mid-panel end tabs 63 will overlap adjacent side panel end tabs 51 when the pen 1 is erected, such that the openings 64 and 52 in the overlapping mid-panel and side-panel end tabs 63 and 51 will be alignment to receive fourth attachment fasteners 53. The fourth attachment fasteners 53 are tightened such that the mid-panel and side panel end tabs 63 and 51 are clamped together.

The second set of connection tabs on the middle panel top rail 58 are the mid-panel intermediate tabs 65. See FIG. 14. In the preferred embodiment, there are two such mid-panel intermediate tabs 65 disposed on either side of the top rail 58 at its middle point. The mid-panel intermediate tabs 65 are also formed as generally planar members. Each is formed with an opening 66 for receiving a fourth attachment fastener 53. The mid-panel intermediate tabs 65 extend generally perpendicular to the studs 60 and generally parallel to the rectangular platform when the enclosure is erected. The mid-panel intermediate tabs 65 are welded to the top rail 58. The mid-panel intermediate tabs 65 are made from 6061-T6 aluminum and are approximately ¼" thick.

In the preferred embodiment, two end panels 50 are also provided that are similar to the middle panel 47 in size, but have kick plates 67 instead of bottom rails. See FIGS. 17, 18 and 19.

Each end panel 50 is framed with a top rail 68 and a kick plate 67 along the top and bottom edges of the end panel 50 respectively. See FIG. 18. The top rail 68 and the kick plate 67 are disposed generally parallel to each other.

A plurality of vertically disposed studs 69 connect the top rail 68 to the kick plate 67. The number of vertically disposed studs 69 used will depend on the desired spacing between the studs 69. In the preferred embodiment, where cattle are to be transported, the studs 69 are generally spaced 15" apart. The studs 69 are welded to the top rail 68 and the kick plate 67. Preferably, the tops of the studs 69 are cut to form a saddle in which the top rail 68 can rest.

The top rail 68 and studs 69 are made of hollow 6061-T6 aluminum tubing. The top rail 68 tubing has a diameter of 2.5". The studs 69 have a diameter of approximately 2.5" as well. The kick plate 67 is also made from 6161-T6 aluminum, and is approximately ¼" thick.

The kick plates 67 of the end panels 50 are formed in a similar fashion as the side panel kick plates 17, however, there is no need in the preferred embodiment to provide the end panel kick plate 67 with either winch or hook assemblies. The kick plate 67 is formed with a generally elongated planar main body 70, having a top edge 71, and with an outwardly extending lower flange 72 disposed at a right angle to the main body 70 of the kick plate 67. See FIG. 19. This lower flange 72 rests on the rectangular platform 2. Because, in the preferred form, the impermeable membrane 22 for containing the livestock waste is tied to the kick plate 67 near its top edge 71, the kick plate 67 needs to be tall enough to anchor the impermeable membrane 22 above the level of waste in the enclosure. See FIG. 9 and FIG. 18. As is shown in FIG. 18, openings 73 are provided in the kick plate 67 near its top edge 71 for anchoring the impermeable membrane 22.

As shown in FIG. 19, attached to the kick plates 67 of the end panels 50 at their outer edges are side panel connector gussets 74. The side panel connector gussets 74 are welded to the kick plate 67. These gussets 74 are generally planar and rectangular and lie perpendicular to the kick plate 67. These gussets 74 are formed with openings 75 for receiving third attachment fasteners 49. When the pen 1 is erected, the side panel connector gusset 74 of the end panels 50 will lie adjacent to selected ends of the kick plates 17 of the side panels 10. The openings 75 formed in the side panel connector gusset 74 will align with the end panel attachment openings 48 in the selected ends of the side panel kick plates 17. With the openings 75 and 48 in alignment third attachment fasteners 49 can be inserted therethrough to rigidly connect the end panel 50 to the side panel 10. If the side panel connector gusset 74 of the end panel 50 does not register with the kick plate 17 of the side panel 10, a spacer can be placed between them to make the connection more rigid.

See FIG. 17, in the preferred embodiment, the top rail 68 of each end panel 50 is provided with a plurality of connection tabs. The connecting tabs attach the top rail 68 to the other components of the enclosure. The first set of connection tabs are the end panel end tabs 76 which are located at the ends of the top rail 68. The end panel end tabs 76 are each formed with an opening 77 for receiving a fourth attachment fastener 53. Preferably, the ends of the top rails 68 are notched and the end panel end tabs 76 are inserted into the notches and welded in place. The end panel end tabs 76 are generally planar and rectangular in configuration, and extend parallel to the rectangular platform 2. The end panel end tabs 76 are made from 6061-T6 aluminum and are approximately ¼" thick.

The end panel end tabs 76 and the side panel end tabs 51 connect to an intermediate member called a corner bracket 78. See FIGS. 2 and 21. The corner bracket 78 is formed as a generally L-shaped member, with an opening in each of the legs. The interior angle of the L-shaped member is meant to receive the two interior sides of the corner post 9 of the rectangular platform 2. Abutment plates may be provided on the two interior angle edges of the L-shaped corner bracket 78 to provide strength. The abutment plates would be welded to the L-shaped corner bracket 78 and disposed perpendicular to it.

When the pen 1 is erected, the corner brackets 78 are attached to adjacent end tabs 76 and 51 of the end panels 50 and side panels 10 with fourth attachment fasteners 53 inserted through the aligned openings and in the corner brackets 78 and the end tabs 76 and 51.

The other connection tab on the end panel top rail 68 is the end panel intermediate tab 79. In the preferred embodiment, the end panel intermediate tab 79 is disposed at the middle point of the top rail 68. See FIG. 17. The end panel intermediate tab 79 is also formed as a generally planar member with an opening 80 for receiving a fourth attachment fastener 53. The end panel intermediate tab 79 extends generally perpendicular to the studs 69 and generally parallel to the rectangular platform 2 when the enclosure is erected. The end panel intermediate tab 79 is welded to the top rail 68. The end panel intermediate tab 79 is made from 6061-T6 aluminum and is approximately ¼" thick.

On all of the panels, rigid polyethylene paneling 18 is mounted by means of brackets 81. See FIGS. 3, 4, 5 and 6. The polyethylene paneling 18 is mounted in abutment, such the animals for the most part will not be able to see outside of the enclosure. The polyethylene paneling 18 also helps to contain waste.

To give the enclosure further rigidity, a top frame is provided. The top frame serves, in part, as a bracing member. In the preferred embodiment, this top frame consists of two identical trusses 82. Each truss 82 connects two opposed side panels 10 as well as the middle panel 47 and an end panel 50. See FIG. 2.

The trusses 82 connect to the intermediate tabs 54, 79 and 65 of the side panels 10, the end panels 50 and the middle panel 47 with fourth attachment fasteners 53.

As shown in FIG. 20, in the preferred embodiment, a truss 82 is constructed in the following manner. A truss end tab is 83 provided that is substantially planar and is formed with an opening 84 for receiving a fourth attachment fastener 53.

Two first tube braces 85 of substantially equal length are connected to the first truss end tab 83. Preferably, notches are formed in the ends of the fist tube braces 85 that will connect to the truss end tab 83. The truss end tab 83 is received in those notches and welded to the first tube braces 85. The first tube braces 85 extend away from the truss end tab 83 forming an interior angle between them that is less than 180 degrees.

Each of the free ends of the first tube braces 85 is attached to a separate truss corner tab 86. The truss corner tab 86 is also substantially planar and is formed with an opening 87 for receiving a fourth attachment fastener 53. Like the connection between the truss end tab 83 and the first tube braces 85, each truss corner tab 86 is preferably inserted into a notch in a first tube brace 85 and then welded to it.

A second tube brace 88 spans between the truss corner tabs 86, connecting them and forming a triangular frame with the first tube braces 85. The connection between the second tube brace 88 and the two truss corner tab 86 is also made by notching the ends of the second tube brace 88 and fitting the truss corner tabs 86 into the notches and welding.

Third tube braces 89 of substantially equal length are connected to each of the truss corner tabs 86. These third tube braces 89 extend from the truss corner connectors 86 on intersecting paths to create a similar triangular frame disposed opposite the first triangular frame created by the first tube braces 85 and the second tube brace 88.

The third tube braces 89 are connected by a truss center tab 90 that is received in notches in the free ends of the third tube braces 89 and welded to them.

Also extending from each of the truss corner tabs 86 is a fourth tube brace 91. These fourth tube braces 91 are of substantially equal length and extend generally parallel to each other and away from the first tube braces 85. The fourth tube braces 91 are each connected to a truss corner tab 86 in a similar fashion as described above and each is also connected to a truss middle tab 92 in a similar fashion as described above.

The truss middle tab 92 is also a generally planar member with an opening 93 for receiving a fourth attachment fastener 53.

Each of the truss middle tabs 92 is connected to the truss center tab 90 by fifth tube braces 94. The two fifth tube braces 94 are substantially equal in length and are disposed in a line. Each fifth tube brace 94 together with an adjacent fourth tube brace 91 and an adjacent third tube brace 89 creates a triangular frame.

The fifth tube braces 94 connect to the truss middle tabs 92 and to the truss center tab 90 in the manner as described above for similar connections.

The remaining portion of the truss 82 is constructed in a similar manner and is a mirror image of the first portion of the truss 82 already described. Two additional third tube braces 89 are connected to the truss center tab 90, and extend away from the truss center tab 90, each in line with a third tube brace 89 connected to the truss center tab 90. Two additional fourth tube braces 91 extend away from the truss middle tabs 92, each in line with a fourth tube brace 91. Each additional third tube brace 89 connects to an intersecting, additional fourth tube brace 91 by means of a truss corner tab 86. The two additional truss corner tabs 86 are connected by an additional second tube brace 88, creating another triangular framing element between the two additional third tube braces 89 and the additional second tube brace 88. Finally, two additional first tube braces 85 are connected to each of the additional two truss corner tabs 86 and intersect at an additional truss end tab 83.

The components of the truss are also preferably made out of 6061-T6 aluminum with the tube braces being approximately 1.25' to 1.5" inches in diameter.

The truss 82 is designed so that when the pen 1 is erected, one of the truss end tabs 83 will overlap with an end panel intermediate tab 79, such that the openings 80 and 84 in the tabs 79 and 83 align and can receive a common fourth attachment fastener 53. The other truss end tab 83 will overlap a middle panel intermediate tab 65 and the openings 66 and 84 in the tabs 65 and 83 will align to receive a fourth attachment fastener 53. Further, when the truss 82 is attached to the side panels 10, the fourth tube braces 91 will parallel the top rails 16 of the side panels 10. Each of the truss corner tabs 86 will connect to a side panel intermediate tab 54 by means of a fourth attachment fastener 53. Each of the truss middle tabs 92 will also connect to separate side panel intermediate tab 54 by means of a fourth attachment fastener 53.

After the side panels 10, the end panels 50, and the middle panel 47 have been connected to each other, impermeable membranes 22 are installed in each of the enclosures formed. In the preferred embodiment, the impermeable membrane 22 is a tarp with grommets spaced around its edges. The tarp is made from vinyl-coated nylon. The tarp is large enough to cover one-half of the rectangular platform 2 as well as extend up to the top edges 20 and 71 of the kick plates 17 and 67 of the side and end panels 10 and 50 and to a similar height on the middle panel 47. The tarp is rectangular in shape and folded over itself at the corner intersections of the side panels 10 with the end panel 50 and the middle panel 47. Ties are looped through the grommets in the tarp and through the openings 23 and 27 in the kick plates 17 and 67. The middle panel 47 is provided with intermediate cross bars 95 for securing the tarp. See FIG. 5.

After the tarp is laid down and secured, stall mats 96 are placed over the tarp to protect it. See FIG. 9.

If the voyage will be of a long duration, a feeding trough 97 can be placed in each of the enclosures created by the middle panel 47 that divides the pen 1 into two enclosures. See FIG. 2. The feeding troughs 97 can be secured to the middle pane 47.1

The pen 1 can also be provided with mesh or tarp spread over the top frame to provide shade to the animals. It is preferred during most voyages that the rectangular platforms 2 with animals be shipped near deck level so that handlers can reach the animals. Since container ships usually stack many levels of containers in each column, the rectangular platforms will generally have containers stacked above them that can provide shade to the animals during the voyage.

The preferred embodiment of the present invention involves erecting panels on a rectangular platform 2 having corner posts 9. The corner posts 9 provide longitudinal resistance to movement of the panels, as well as aiding the straps 22 and flange hooks 29 in providing lateral or transverse resistance. Additional anchoring points and lashing points on the rectangular platform 2 can be used to anchor the panels against longitudinal and lateral or transverse forces with methods generally known in the art.

As is shown in FIG. 22, panels may be eliminated from the pen 1 and the enclosure still maintained. FIG. 22 shows a rectangular platform 2' with incomplete superstructure and fixed ends, wherein the fixed ends consist of a complete end structure (end walls 98). Because end walls 98 are present on the rectangular platform 2', end panels 50 are not needed to complete the enclosure. FIG. 22 shows a cross bar 99 connecting two opposed corner brackets 78 to provide further stability to the structure.

As shown in the drawings, the rectangular platforms 2 and 2' are provided with corner fittings 100 to allow stacking of the rectangular platforms 2 and 2' with other standardized freight containers, and to allow easy attachment of the rectangular platforms 2 and 2' to trucks and rail cars designed to carry standardized freight containers.

I claim:

1. A livestock pen for transporting livestock by rail, truck or on a container ship with other standardized freight containers, comprising:
   a. a platform based container open sided, said platform based container open sided lacking rigid side walls and having a base similar to that of a platform container, said platform based container open sided being formed with corner fittings to allow stacking of said rectangular platform based container open sided with other said standardized freight containers, and said platform based container open sided being rectangular in shape;
   b. a plurality of panels erected on and connected to said platform based container open sided, creating an enclosed area on said rectangular platform based container open sided for containing livestock; and
   c. an impermeable membrane installed in said enclosed area, said impermeable membrane covering said base and extending up said panels a selected distance for containing waste produced by said livestock.

2. A livestock pen for transporting livestock by rail, truck or on a container ship with other standardized freight containers, comprising:
   a. a platform based container open sided, said platform based container open sided lacking rigid side walls and having a base similar to that of a platform container, said platform based container open sided being formed with corner fittings to allow stacking of said rectangular platform based container open sided with other said standardized freight containers, and said platform based container open sided being rectangular in shape;
   b. at least one panel erected on said platform based container open sided such that an enclosed area on said platform based container open sided for containing livestock exists;
   c. an impermeable membrane installed in said enclosed area, said impermeable membrane covering said base and extending up said enclosed area a selected distance for containing waste produced by said livestock.

3. The livestock pen of claim 1, wherein:
   a. said platform based container open sided comprises:
      1. a base having a top and a bottom,
      2. a perimeter extending around said top of said base, defined by two side edges and two end edges,
      3. said side edges and said end edges meeting at four corners,
      4. said rectangular platform based container open sided having four posts of equal height, attached to said base, located at said four corners and extending from said top of said base,
      5. said posts together with said two side edges and said two end edges defining four perimeter planar areas extending perpendicular to said base and from said top of said base at said perimeter of said base,
      6. at least one of said perimeter planar areas being open to the air during transit of said rectangular platform based container open sided; and wherein
   b. at least one of said plurality of panels erected on and connected to said rectangular platform based container open sided, creating an enclosed area on said rectangular platform based container open sided for containing livestock, extends across said one of said four perimeter planar areas open to said air and extending perpendicular to said base.

4. The livestock pen of claim 2, wherein:
   a. said platform based container open sided comprises:
      1. a base having a top and a bottom,
      2. a perimeter extending around said top of said base, defined by two side edges and two end edges,
      3. said side edges and said end edges meeting at four corners, 4. said rectangular platform based container open sided having four posts of equal height, attached to said base, located at said four corners and extending from said top of said base,
5. said posts together with said two side edges and said two end edges defining four perimeter planar areas extending perpendicular to said base and from said top of said base at said perimeter of said base,
6. at least one of said perimeter planar areas being open to the air during transit of said rectangular platform based container open sided; and wherein b. said at least one panel erected on said rectangular platform based container open sided such that an enclosed area on said rectangular platform based container open sided for containing livestock exists, extends across said one of said four perimeter planar areas open to said air and extending perpendicular to said base.

5. The livestock pen of claim 1, wherein:

said panel consists of a frame, and paneling is attached to said frame to prevent livestock seeing out of said pen.

6. The livestock pen of claim 1, wherein:

one of said panels is formed with a flange hook that anchors said panel to said rectangular platform based container open sided.

7. The livestock pen of claim 1, wherein at least two panels are used and said panels are disposed opposite each other and said pen further comprises:

a tensioning member connecting said oppositely disposed panels.

8. The livestock pen of claim 1, wherein at least two panels are used and said panels are disposed opposite each other and said pen further comprises:

a bracing member connecting said oppositely disposed panels.

9. The livestock pen of claim 2, wherein said panel comprises:

a. a frame having a top and a bottom; and b. a flange hook mounted to the bottom of said frame that anchors said panel to said rectangular platform based container open sided.

10. The panel of claim 9, further comprising:

means for receiving a tensioning member connected to said frame.

11. The panel of claim 10, wherein:

said means for receiving a tensioning member is a winch assembly.

12. The panel of claim 10, wherein:

said means for receiving a tensioning member is a hook assembly.

13. A method of transporting livestock, comprising:

a. erecting an enclosure on a platform based container open sided with panels, said platform based container open sided lacking rigid side walls and having a base similar to that of a platform container, said platform based container open sided being formed with corner fittings to allow stacking of said rectangular platform based container open sided with other said standardized freight containers, and said platform based container open sided being rectangular in shape, said enclosure having an impermeable membrane installed in said enclosure, said impermeable membrane covering said base and extending up said enclosure a selected distance for containing waste produced by said livestock;

b. loading livestock into said enclosure;

c. loading said platform based container with said livestock onto a means of transport;

d. moving said means of transport;

e. unloading said livestock from said enclosure.

14. The method of claim 13 wherein:

said means of transport is a container ship.

15. The method of claim 13 wherein:

said means of transport is a truck.

16. The method of claim 13 wherein:

said means of transport is a rail car.

* * * * *

UNITED STATES PATENT AND TRADEMARK OFFICE
CERTIFICATE OF CORRECTION

PATENT NO.    : 6,792,892 B2
DATED         : September 21, 2004
INVENTOR(S)   : Peter C. Craig It is certified that error appears in the above-identified patent and that said Letters Patent is hereby corrected as shown below:

Column 5,
Line 2, replace "structures I capable" with -- structures capable --.

Column 6,
Line 48, replace "has a diameter of 2'" with -- has a diameter of 2" --.
Line 51, replace "approximately 1/4 thick" with -- approximately 1/4" thick --.

Signed and Sealed this

Eighteenth Day of January, 2005

JON W. DUDAS
*Director of the United States Patent and Trademark Office*